United States Patent [19]

Baumgarth

[11] Patent Number: 5,078,412
[45] Date of Patent: Jan. 7, 1992

[54] SEPARATELY LOADED STRIP SEAL

[75] Inventor: Charles F. Baumgarth, North Palm Beach, Fla.

[73] Assignee: United Technologies Corporation, Hartford, Conn.

[21] Appl. No.: 637,847

[22] Filed: Jan. 7, 1991

[51] Int. Cl.$^5$ .............................................. F16J 15/06
[52] U.S. Cl. .................... 277/138; 277/140; 277/236; 239/127.1; 239/127.3
[58] Field of Search ............... 277/138, 140, 161, 175, 277/176, 194, 236; 239/127.1, 127.3, 265

[56] References Cited

U.S. PATENT DOCUMENTS

| | | | |
|---|---|---|---|
| 4,090,720 | 5/1978 | Morsbach et al. | 277/140 |
| 4,277,047 | 7/1981 | Zinnai | 277/236 |
| 4,429,885 | 2/1984 | Chiba et al. | 277/140 |
| 4,575,099 | 3/1986 | Nash | 277/138 |

*Primary Examiner*—William A. Cuchlinski, Jr.
*Assistant Examiner*—Daniel G. DePumpo
*Attorney, Agent, or Firm*—Christopher T. Hayes

[57] ABSTRACT

Disclosed is a continuous fluid pressure seal for use between two members that move relative to each other, that can withstand high temperatures, and that is separately loaded so as not to rely solely on a pressure differential across the seal for correct seating and orientation. The present invention further provides a seal which is effective between to movable members despite the presence of an obstruction therebetween.

13 Claims, 4 Drawing Sheets

SEPARATELY LOADED STRIP SEAL

The invention was made under a U.S. Government contract and the Government has rights herein.

1. Technical Field

This invention relates to sealing devices, and more particularly to fluid seals between movable members of a component.

2. Background Art

In certain high temperature environments, such as in nozzles for a gas turbine engines, certain structural components of the divergent flaps may not be able to withstand extended high temperatures, and therefore need to be protected from the intense heat of the gas turbine exhaust. Such protection is typically provided by one or more liners attached to each of the divergent flaps, liners which prevent direct contact between the exhaust gas and certain portions of the divergent flap, and reduce heat transfer therebetween.

One of the problems with attaching a liner to a divergent flap is that substantial differences in thermal expansion between the liner and the flap typically occur during operation of the gas turbine engine. To allow for such thermal expansion, an edge of the liner may be left free to slide with respect to the flap. As a result, at certain nozzle conditions the exhaust gas may flow behind the liner at that edge, exposing the shielded portion of the flap to the high temperatures of the exhaust gas.

To prevent exhaust gas flow behind the liner, and to prevent excessive leakage of cooling air, it would be desirable to provide a seal between the liner and the divergent flap. Most elastomeric materials melt at the high temperatures experienced between the liner and divergent flap, and non-elastomeric seals are subject to being improperly oriented as the liner moves relative to the divergent flap, thereby impairing the effectiveness of the seal. Additionally, there may be very little space available for accommodating the seal, and there may be obstructions which prevent using the nonelastomeric seals known in the art.

What is needed is a fluid seal for use between two members that move relative to each other which does not rely solely on a pressure differential across the seal to ensure correct seating and orientation of the seal, and which can withstand high temperatures, such as those experienced between a liner and a divergent flap.

DISCLOSURE OF INVENTION

It is therefore an object of the present invention to provide a fluid pressure seal for use between two members that move relative to each other that can withstand high temperatures and which is separately loaded so as not to rely solely on a pressure differential across the seal for correct seating and orientation.

It is a further object of the present invention to provide a seal which can effectively seal between two movable members despite the presence of an obstruction therebetween.

According to the present invention, a fluid seal is disclosed which includes a strip seal, a portion of which is located in a channel in a first member, such as a liner, and a second portion which sealingly contacts a sealing surface of a second member, such as a divergent flap. The strip seal is separately loaded, or biased, against one wall of the channel and the sealing surface by a spring located within the channel. The spring insures that the strip seal remains in sealing contact with the channel and the sealing surface, independent of any pressure differentials across the strip seal which may also promote sealing contact, to prevent fluid flow around the seal.

The strip seal and spring are made of materials which can withstand the temperatures to which the leading edge of the liner is exposed. As the members move relative to each other, as may occur due to differences in thermal expansion, the strip seal slides along the sealing surface, maintained in a sealing position by the spring. Thus the seal of the present invention is able to operate over a broad pressure range to effectively prevent the flow of fluid past the seal.

The foregoing and other features and advantages of the present invention will become more apparent from the following description and accompanying drawings.

BEST MODE FOR CARRYING OUT THE INVENTION

Figure 1:
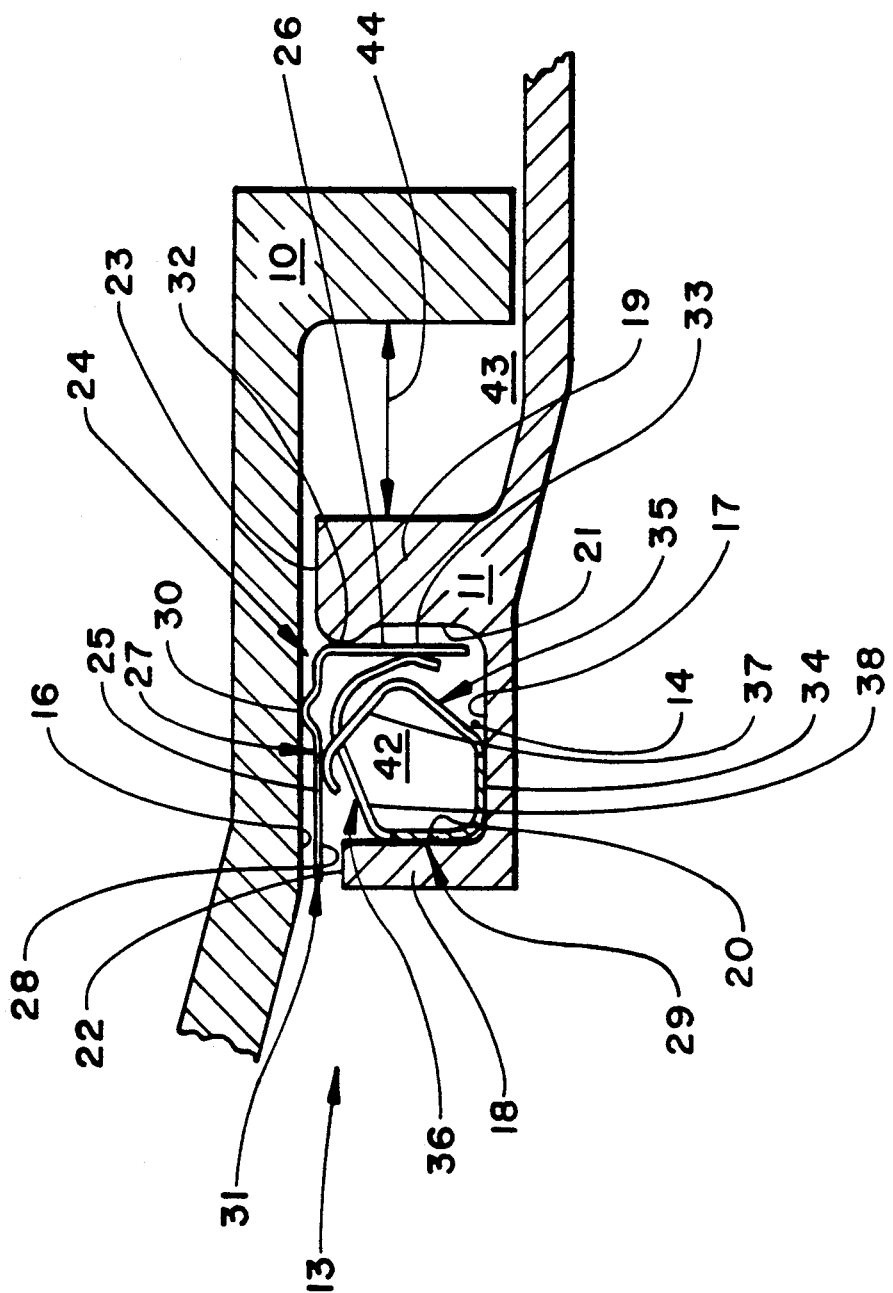
FIG. 1 shows a cross-sectional view of a seal of the present invention providing a seal between a liner edge and a divergent flap of a gas turbine engine nozzle.

FIG. 1 shows a first embodiment of the present invention used to provide a fluid seal between two members 10, 11 which move relative to each other in a plane. The seal 13 may be incorporated into a liner 11 in the nozzle of a gas turbine engine to prevent excessive cooling air leakage and to prevent engine exhaust gas from flowing between the liner 11 and a divergent flap 10. Although the present invention is described herein incorporated into a liner 11, such incorporation is exemplary only and is not intended to limit the scope of the claims.

The liner 11 includes a channel 14 having an opening which faces a sealing surface 16 of a divergent flap 10. The channel 14 is defined by a bottom surface 17 with two walls 18, 19 extending therefrom, each wall 18, 19 having an inner surface 20, 21, and an end 22, 23 adjacent, and in spaced relation to, the sealing surface 16 of the divergent flap 10. Preferably, at least one of the walls 19 is substantially perpendicular to the sealing surface 16, for reasons which are discussed below.

The seal 13 includes a continuous strip seal 24 which has a first flange 25 that is substantially parallel to the sealing surface 16, and a second flange 26 which is substantially perpendicular to the first flange 25. The first flange 25 has a first surface 27 which faces the sealing surface 16 and a second surface 28 which faces the channel 14. The second flange 26 is integral with the first flange 25 and extends into the channel 14 adjacent one of the walls 19. The strip seal 2 is urged into sealing contact with one of the walls 19 and the sealing surface 16 by spring means 29 located in the channel 14.

The first flange 25, located between the channel 14 and the sealing surface 16, is preferably substantially planar and lies in a plane which is substantially parallel to the sealing surface 16. A first ridge 30, running the length of the strip seal 24, extends from the first flange 25. The first ridge 30 sealingly contacts the sealing surface 16, supporting the first flange 25 in spaced relation thereto. The edge portion 31 of the first flange 25 is interposed between the sealing surface 16 and one of the wall ends 22 to maintain the first flange 25 substantially parallel to the sealing surface 16, as discussed below.

The second flange 26 sealingly contacts one of the walls 19 at a seal bead 32 integral with the wall 19 and located adjacent the end 23 thereof. The seal bead 32 supports a portion 33 of the second flange 26 in spaced relation to the adjacent wall 19, that portion 33 of the second flange 26 being urged into sealing contact with the seal bead 32 by the spring means 29.

The spring means 29 is located in the channel 14 and has a base 34 from which a first flexible member 35 extends, and a second flexible member 36 which extends in a direction which is clockwise opposed to the first flexible member 35. As used in this disclosure, the term "clockwise opposed" is used to mean that if one of the flexible members 36 extends clockwise from the base 34 and the other 35 extends counterclockwise from the base 34, the two members 35, 36 extend from the base 34 in "clockwise opposed" directions. The first flexible member 35 contacts the first flange 25 to urge the strip seal 24 into sealing contact with the sealing surface 16, and the second flexible member 36 contacts the second flange 26 to simultaneously urge the strip seal 24 into sealing contact the seal bead 32. The base 34 of the spring means 29 is shaped to substantially conform to the bottom 17 and the inner surface 20 which it contacts to prevent shifting of the spring means 29 and strip seal 24 as the flexible members 35, 36 flex.

Preferably, each of the flexible members 35,36 is a set of flexible fingers 37, 38 which intermittently contact the strip seal 24 along its length. A gap is located between each finger 37 and the adjacent fingers 37 of a flexible member 35, and is wide enough to allow the fingers 38 of the other flexible member 36 to be interposed therebetween without causing interference between the fingers of opposing flexible members 35, 36. Thus the action of the first set of fingers 35 against the first flange 25 does not interfere with the action of the second set of fingers 36 against the second flange 26.

Figure 2:
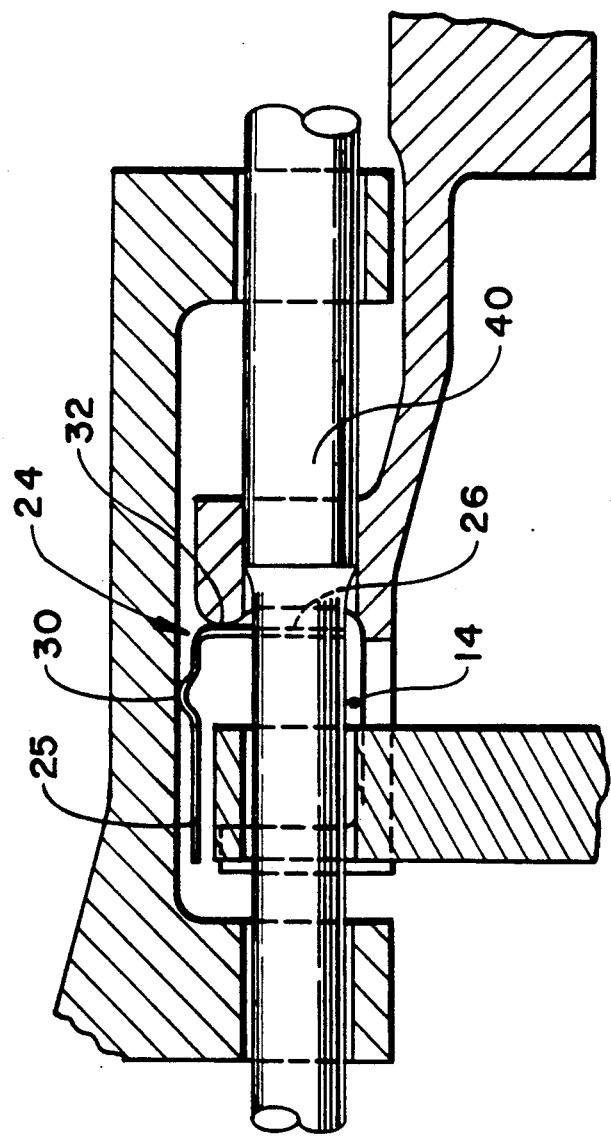
FIG. 2 shows the seal of FIG. 1 at a local obstruction.

In some applications, local obstructions 40 such as pins or rods may pass through the channel 14, as shown in FIG. 2. At such obstructions 40, one or both of the flanges 25, 26 may be modified to prevent the obstruction 40 from reducing the effectiveness of the strip seal 24. As those skilled in the art will readily appreciate, much of the area of each flange 25, 26 merely provides a bearing surface for the fingers 37, 38 of the spring means 29, and small portions of the flange 25, 26 material not lying between the ridge 30 and the seal bead 32 can be removed to accommodate local obstructions 40 without impairing the effectiveness of the strip seal 24.

Figure 3:
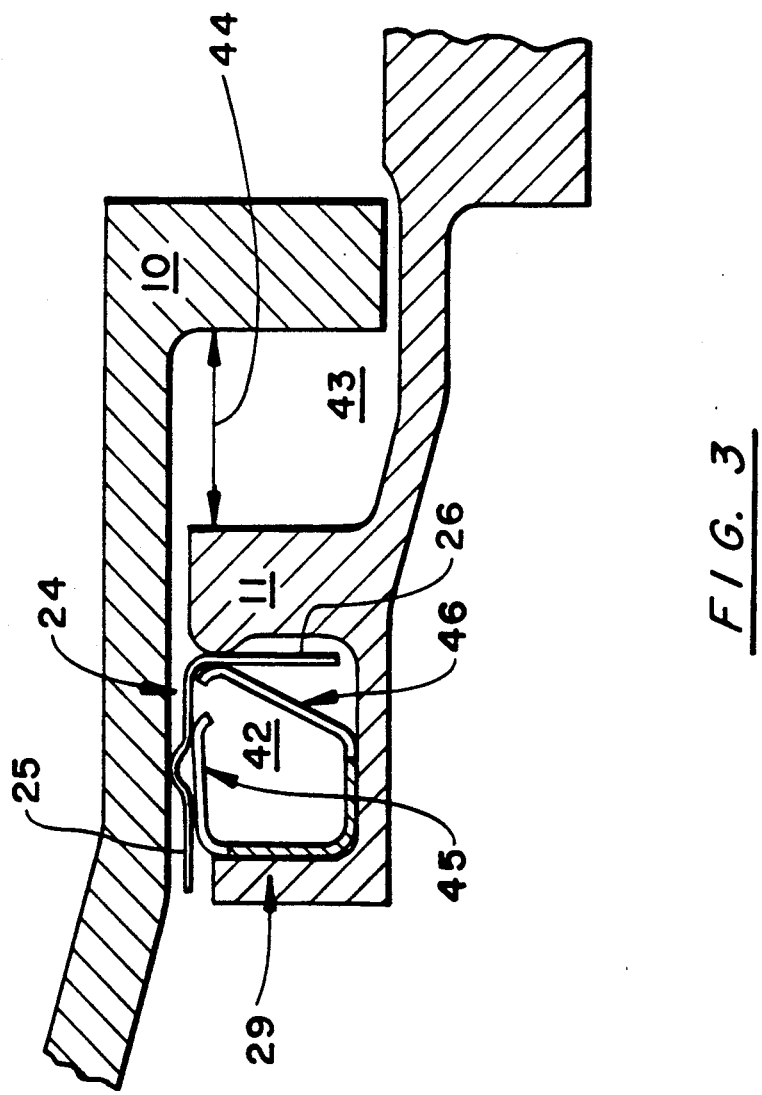
FIG. 3 shows the seal of FIG. 1 incorporating an alternative spring.

At such local obstructions 40 the spring means 29 may be discontinuous and actually made up of several separate springs. As long as the strip seal 24 is supported on either side of any local obstructions 40, and the obstructions 40 are not too large, the effectiveness of the seal 13 is not impaired. The spring means 29 itself may be of an alternative design depending on the specific application. For example, the spring means 29 may be of a type which has fingers 45, 46, which are not interposed, as shown in FIG. 3, if the application is such that movement of the flanges 25, 26 is so slight that such a spring means 29 can adequately urge the strip seal 24 against the movable members 10, 11 at all seal operating conditions.

Figure 4:
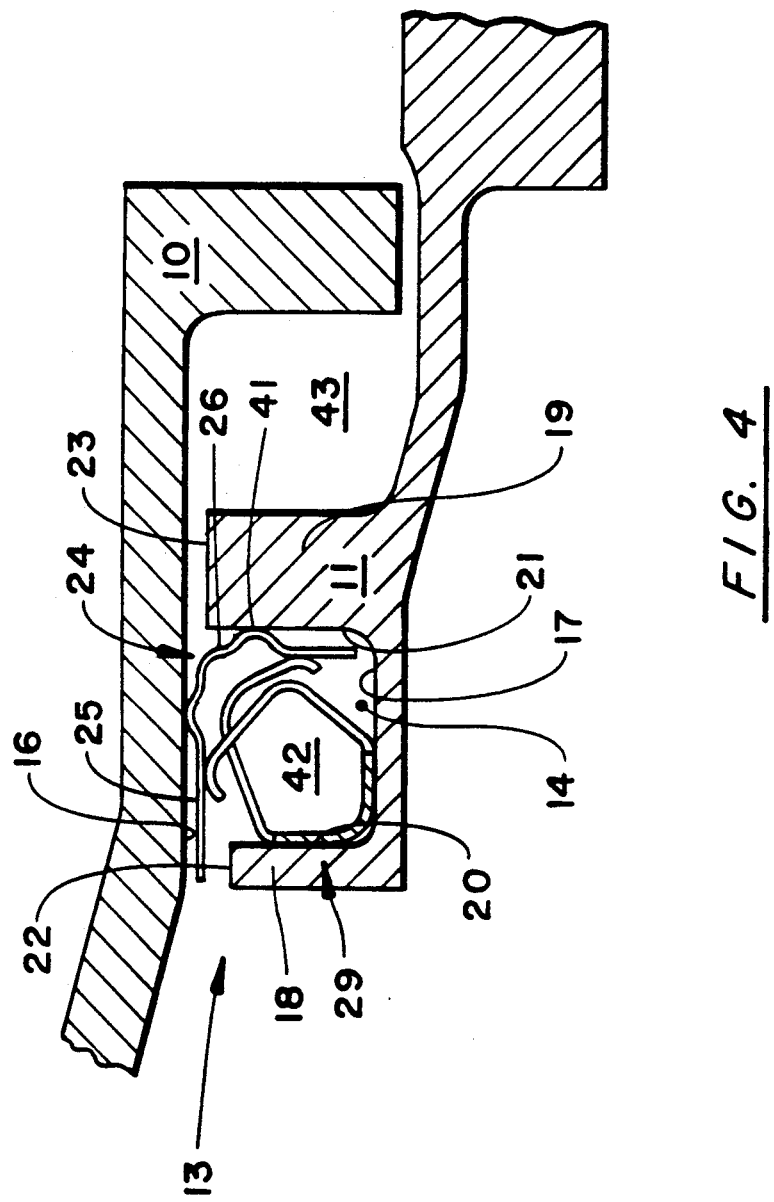
FIG. 4 shows a cross-sectional view of the preferred embodiment of the present invention providing a seal between a liner edge and a divergent flap of a gas turbine engine nozzle.

An alternative embodiment of the present invention is shown in FIG. 4. In this embodiment a second ridge 41, extending from the second flange 26, is substituted for the seal bead 32. The second ridge 41, integral with the second flange 26 and supporting the second flange 26 in spaced relation to one of the walls 19, is urged into sealing contact with the wall 19 by the spring means 29. For many applications, the seal 13 as disclosed in FIG. 4 is the preferred embodiment because it does not require complex machining of a seal bead 32 into one of the channel walls 19.

One benefit of the present invention is the ease of assembly. The spring means 29 is simply placed into the channel 14 of a member 11 and the second flange 26 of the strip seal 24 is slid between the spring means 29 and the adjacent wall 19. The member 11 is then secured to the other member 10, and the spring means 29 urges the first ridge 30 into contact with the sealing surface 16 of the other member 10.

During use of the present invention the strip seal 24 defines the boundary of a first fluid volume 42, and a second fluid volume 43 at a generally lower pressure than the first fluid volume 42. The pressure differential between the first and second fluid volumes 42, 43 urges the strip seal 24 into sealing contact with the movable members 10,11. The spring means 29 ensures that, should the pressure differential between the two volumes 42, 43 drop too low to support the strip seal 24, the strip seal 24 remains correctly positioned against the two members 10,11.

When the two members 10, 11 move relative to each other, as may occur due to differences in thermal expansion rates between the two members 10, 11, the spring means 29 maintains the simultaneous contact between the strip seal 24 and the movable members 10, 11 despite such movement 44, thereby preventing fluid exchange between the first and second volumes 42,43. Since the edge portion 31 of the first flange 25 is interposed between the sealing surface 16 and the adjacent end 22 of one of the walls 18 of the channel 14, the adjacent end 22 supports the first flange 25 as the members 10, 11 move axially 44. This support maintains the first flange 25 substantially parallel to the seal surface 16, thereby preventing the first flange 25 from shifting to an orientation which might compromise the effectiveness of the strip seal 24 as the members 10, 11 move. As those skilled in the art will readily appreciate, since the wall 19 against which the second flange 26 is urged is substantially perpendicular to the sealing surface 16, the wall 19 moves the strip seal 24 without imparting forces normal to the first flange 25 thereto, forces that could cause the seal 13 to fail due to fatigue after repeated bending.

Although this invention has been shown and described with respect to detailed embodiments thereof, it will be understood by those skilled in the art that various changes in form and detail thereof may be made without departing from the spirit and scope of the claimed invention.

We claim:

1. A seal for preventing the passage of a fluid between two relatively movable members, one of the movable members having a channel defined by a bottom surface and two walls extending therefrom, each wall having an end adjacent a sealing surface of the other movable member, the sealing surface substantially perpendicular to at least one of the walls and in spaced relation to the ends of the walls, the seal comprising:

a strip seal including
a first flange which is substantially parallel to the sealing surface, the first flange located between the channel and the sealing surface,
a first ridge extending from the first flange, the first ridge in sealing contact with the sealing surface and supporting the first flange in spaced relation thereto, and
a second flange integral with the first flange, the second flange extending into the channel and in sealing contact with an inner surface of one of the walls of the channel; and,
spring means for urging the strip seal into simultaneous contact with the movable members;
wherein the spring means maintains the simultaneous contact between the strip seal and the movable members despite movement thereof.

2. The seal of claim 1 wherein a portion of the first flange is interposed between the sealing surface and one of the wall ends to maintain the first flange substantially parallel to the sealing surface.

3. The seal of claim 2 wherein the second flange sealingly contacts the inner surface of one of the walls at a seal bead thereon, a portion of the second flange is cantilevered from the seal bead, and the second flange is urged into sealing contact therewith by the spring means.

4. The seal of claim 2 wherein the strip seal further comprises a second ridge integral with the second flange and supporting the second flange in spaced relation to the inner surface of one of the walls, the second ridge urged into sealing contact therewith by the spring means.

5. The seal of claim 3 wherein the spring means is in the channel and comprises:
a base,
at least one first flexible member extending from the base and contacting the first flange to urge the strip seal into sealing contact with the sealing surface, and
at least one second flexible member extending from the base and contacting the second flange to urge the strip seal into sealing contact the seal bead.

6. The seal of claim 3 wherein the spring means is in the channel and comprises:
a base,
a first set of flexible fingers extending from the base and contacting the first flange to urge the strip seal into sealing contact with the sealing surface, and
a second set of flexible fingers extending from the base and contacting the second flange to urge the strip seal into sealing contact with the seal bead.

7. The seal of claim 6 wherein the flexible fingers of the first set extend from the base in a first direction and the flexible fingers of the second set extend from the base in a direction which is substantially clockwise opposed to the first direction.

8. The seal of claim 7 wherein the flexible fingers of the first set are interposed with the flexible fingers of the second set.

9. The seal of claim 4 wherein the spring means is in the channel and comprises:
a base,
at least one first flexible member extending from the base and contacting the first flange to urge the strip seal into sealing contact with the sealing surface, and
at least one second flexible member extending from the base and contacting the second flange to urge the strip seal into sealing contact with the inner surface of one of the walls.

10. The seal of claim 4 wherein the spring means is in the channel and comprises:
a base,
a first set of flexible fingers extending from the base and contacting the first flange to urge the strip seal into sealing contact with the sealing surface, and
a second set of flexible fingers extending from the base and contacting the second flange to urge the strip seal into sealing contact with the inner surface of one of the walls.

11. The seal of claim 6 wherein the flexible fingers of the first set extend from the base in a first direction and the flexible fingers of the second set extend from the base in a direction which is substantially clockwise opposed to the first direction.

12. The seal of claim 11 wherein the flexible fingers of the first set are interposed with the flexible fingers of the second set.

13. A seal for preventing the passage of a fluid between relatively movable members, one of the members having a channel and the other member having a sealing surface adjacent thereto, the channel having a bottom surface and two walls extending therefrom, the seal comprising:
a strip seal which defines the boundary of a first fluid volume and a second fluid volume, the first fluid volume at a higher pressure than the second fluid volume, the strip seal including
a first flange substantially parallel to the sealing surface, the first flange having a first surface which faces the sealing surface and a second surface which faces the channel,
a second flange integral with the first flange, the second flange extending into the channel and in sealing contact with an inner surface of one of the walls of the channel,
a first ridge integral with the first flange, the first ridge in sealing contact with the sealing surface and supporting the first flange in spaced relation to said sealing surface; and,
spring means in the channel for urging the strip seal into simultaneous contact with the movable members, the spring means including
a base contacting the bottom surface of the channel,
at least one first flexible member extending from the base and contacting the first flange urging the strip seal into sealing contact with the sealing surface, and
at least one second flexible member extending from the base and contacting the second flange urging the strip seal into sealing contact with one of the walls;
wherein a portion of the first flange contacts an end of one of the walls of the channel to maintain the first flange substantially parallel to the seal surface, and the spring means maintains the simultaneous contact between the strip seal and the movable members despite movement thereof to prevent fluid exchange between the first and second volumes.

* * * * *

UNITED STATES PATENT AND TRADEMARK OFFICE
CERTIFICATE OF CORRECTION

PATENT NO. : 5,078,412
DATED : January 7, 1992
INVENTOR(S) : Charles F. Baumgarth It is certified that error appears in the above-identified patent and that said Letters Patent is hereby corrected as shown below:

In the ABSTRACT, replace "effective between to movable members despite the pres-" with --effective between two movable members despite the pres- --

Column 2, line 41, replace "1I" with --11--

Column 2, line 60, replace "2" with --24--

Column 4, line 14, replace "1I" with --11--

Column 4, line 33, replace "1I" with --11--

Signed and Sealed this

Eighteenth Day of May, 1993

Attest:

MICHAEL K. KIRK

*Attesting Officer*  *Acting Commissioner of Patents and Trademarks*